(12) United States Patent
Fraim et al.

(10) Patent No.: US 11,834,157 B2
(45) Date of Patent: Dec. 5, 2023

(54) LANDING GEAR MOTORIZING CONTROL DEVICE

(71) Applicant: SAFRAN LANDING SYSTEMS, Velizy Villacoublay (FR)

(72) Inventors: Julien Fraim, Moissy-Cramayel (FR); Laurent Boissard, Moissy-Cramayel (FR); Denis Telhadas, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 645 days.

(21) Appl. No.: 16/720,870

(22) Filed: Dec. 19, 2019

(65) Prior Publication Data

US 2020/0198775 A1    Jun. 25, 2020

(30) Foreign Application Priority Data

Dec. 19, 2018  (FR) ...................................... 1873419

(51) Int. Cl.
| | |
|---|---|
| *B64C 25/40* | (2006.01) |
| *B64C 25/32* | (2006.01) |
| *B64C 19/02* | (2006.01) |
| *B64C 25/50* | (2006.01) |
| *F16H 61/28* | (2006.01) |
| *F16H 61/32* | (2006.01) |

(52) U.S. Cl.
CPC ............ *B64C 25/405* (2013.01); *B64C 19/02* (2013.01); *B64C 25/50* (2013.01); *F16H 61/2807* (2013.01); *F16H 61/32* (2013.01)

(58) Field of Classification Search
CPC ....... B64C 19/02; B64C 25/405; B64C 25/50; F16H 61/2807; F16H 61/32
See application file for complete search history.

(56) References Cited

U.S. PATENT DOCUMENTS

| | | | | |
|---|---|---|---|---|
| 5,038,887 | A  * | 8/1991 | Sousek .................. | B60K 26/02 180/327 |
| 9,139,294 | B2 * | 9/2015 | Bayer .................... | B64C 25/405 |

(Continued)

FOREIGN PATENT DOCUMENTS

FR    2 944 775  A1    10/2010

OTHER PUBLICATIONS

French search report for FR Application 18 73419 dated Sep. 6, 2019.

*Primary Examiner* — Christopher D Hutchens
(74) *Attorney, Agent, or Firm* — Sughrue Mion, PLLC

(57) ABSTRACT

The invention relates to a motorizing device (1) for moving an aircraft (A) provided with a landing device (L) having wheels (W) on the ground, the motorizing device comprising at least one electric motor (2) having an output shaft provided with means for its rotational connection to at least one of the wheels (W) of the landing device for driving said wheel in rotation, and an electronic control unit (3) connected on the one hand to the motor to control it and on the other hand to a control interface (4) from which the aircraft pilot can transmit control signals which the electronic control unit (3) is arranged to transform into motor control signals, characterized in that the control unit is arranged to implement a first control law having determined dynamics to promote an aircraft movement speed and a second control law having dynamics to promote aircraft manoeuvrability.

9 Claims, 4 Drawing Sheets

(56) References Cited

U.S. PATENT DOCUMENTS

| | | | |
|---|---|---|---|
| 2008/0147252 A1* | 6/2008 | Bayer | B64C 25/50 318/609 |
| 2009/0261197 A1 | 10/2009 | Cox et al. | |
| 2012/0018574 A1* | 1/2012 | Bayer | B64C 25/405 244/50 |
| 2014/0061373 A1* | 3/2014 | Krenz | B64C 25/50 244/50 |
| 2015/0129713 A1* | 5/2015 | Cox | B64C 25/50 244/50 |
| 2015/0134149 A1* | 5/2015 | De Mers | F16H 61/0202 701/3 |
| 2015/0375853 A1* | 12/2015 | Kawalkar | B64D 31/06 244/50 |
| 2016/0170435 A1 | 6/2016 | Brinkley | |
| 2016/0176517 A1* | 6/2016 | Cox | B64F 5/60 244/50 |
| 2017/0057624 A1 | 3/2017 | Lo et al. | |

* cited by examiner

LANDING GEAR MOTORIZING CONTROL DEVICE

TECHNOLOGICAL BACKGROUND

It is necessary to move aircrafts on the ground between the take-off/landing runway and their parking spaces. Some of these movements follow a straight or curved trajectory with a large radius and are made at a relatively high speed (this is referred to as "taxiing"). Other movements occur before the aircraft stops or follow a curved trajectory with a small radius and must therefore be made at a reduced speed (this is called "manoeuvring").

Conventionally, these movements are performed using:
either, for forward movements, the main engine of the aircraft, i.e. the one used for aerial evolutions, generally a thermal engine;
or, for rearward movements, a ground vehicle coupled to the front landing gear leg of the aircraft.

Such an aircraft has a relatively high overall fuel consumption considering the use of the main engine on the ground and in flight.

To remedy this, it is known to provide the aircraft with a rotation-driving system for one or more wheel(s) of the landing gear of the aircraft so as to allow the aircraft to move on the ground without using its main engine.

To strive to aircrafts provided with more, or only, electric equipment, the rotating drive device uses one or more electric motor(s) that is/are controlled by an electronic control unit connected to a control interface installed in the aircraft cockpit.

However, this arrangement leads to a break in the habits of pilots who have difficulty feeling perfectly comfortable during taxiing.

AIM OF THE INVENTION

One aim of the invention is to supply means for facilitating the control of aircraft on the ground.

BRIEF SUMMARY OF THE INVENTION

For this purpose, according to the invention, a motorizing device is provided for moving on the ground an aircraft having a landing device having wheels, the motorizing device comprising at least one electric motor having an output shaft provided with means for its rotational connection to at least one of the wheels of the landing device to drive said rotating wheel, and an electronic control unit connected on the one hand to the motor to control it and on the other hand to a control interface from which the pilot of the aircraft can transmit control signals which the electronic control unit is arranged to transform into motor control signals. The control unit is arranged to implement a first control law having determined dynamics to promote an aircraft movement speed and a second control law having dynamics to promote the aircraft manoeuvrability.

The ground evolutions of the aircraft include movements along straight paths and movements along curved paths. Straight movements must be possible at a speed between a minimum and maximum speed depending on whether the pilot wishes to stop soon or cross a take-off/landing runway as quickly as possible. The maximum speed of the movements in curves is conditioned by the radius of the curved trajectories: the smaller the radius, the lower the maximum possible speed. The invention allows easy control of the aircraft in each of these phases. The maximum speeds are determined in function of dynamics of the aircraft on the ground resulting from the eight of the center of gravity of the aircraft and the track of the landing gear for example.

Other characteristics and advantages of the invention will become apparent from reading the following description of a particular non-restrictive embodiment of the invention.

BRIEF DESCRIPTION OF THE DRAWINGS

Reference is made to the appended drawings, wherein.

DETAILED DESCRIPTION OF THE INVENTION

Figure 1:
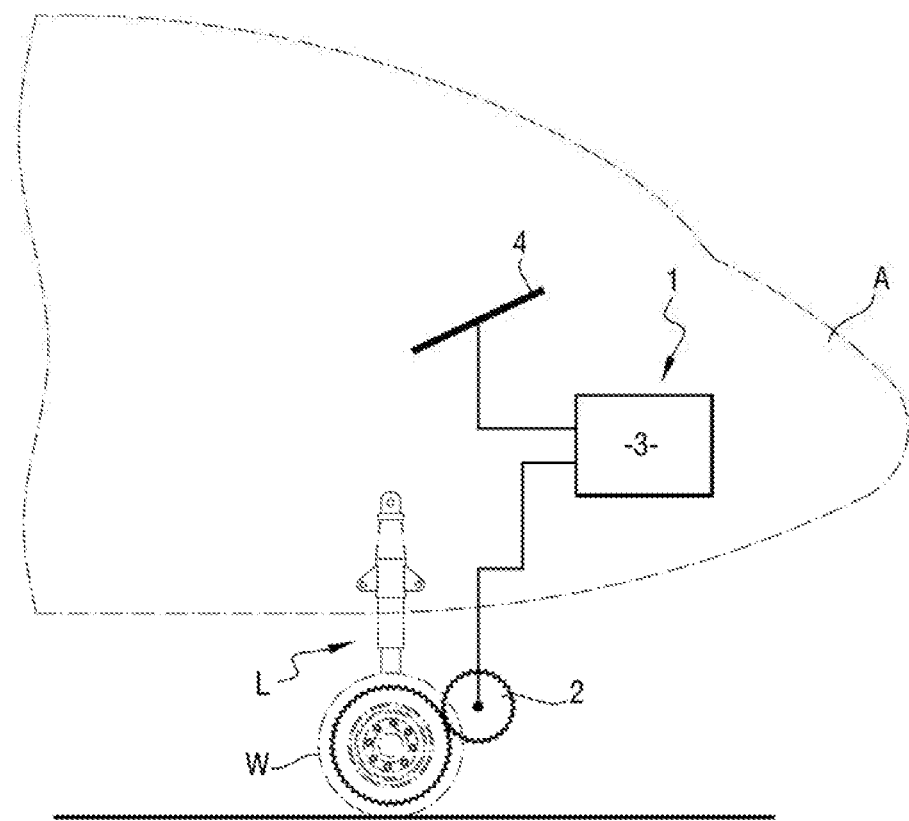
FIG. 1 shows a partial perspective schematic view of an aircraft according to the invention.

The invention is described, with reference to the figures, in application to an aircraft, here an aircraft A, equipped with a landing gear, a front landing gear L with wheels W is shown in FIG. 1. The front landing gear L is known in itself and will not be described in more detail here.

Aircraft A is equipped with a motorizing device, generally referred to as 1, to move the aircraft A on the ground.

The motorizing device 1 comprises an electric motor 2 having an output shaft provided with means for its rotational connection to the wheels W of the front landing gear L for driving said wheels W in rotation.

The motorizing device also includes an electronic control unit 3 connected to the electric motor 2 to control it and to a control interface 4 which is located in the cockpit of the aircraft A. From the control interface 4, the pilot of the aircraft A can emit control signals that the electronic control unit 3 is arranged to transform into motor 2 control signals.

The electronic control unit 3 includes a processor (or any other type of computer such as an ASIC circuit, an FPGA, a microcontroller . . . ) and a memory containing at least one program containing instructions arranged for the implementation of a control program for the motorizing device 1.

The control program executed by the electronic control unit 3 includes several control laws implementing loops and control strategies to control the motor 2 according to the electrical signals emitted by the control interface 4, namely:
a first control law having determined dynamics to favour a movement speed of the aircraft A,
a second control law having dynamics that favours the manoeuvrability of the aircraft A in a forward direction of travel,
a third control law with determined dynamics to promote the manoeuvrability of aircraft A in a reversing direction.

Figure 4:
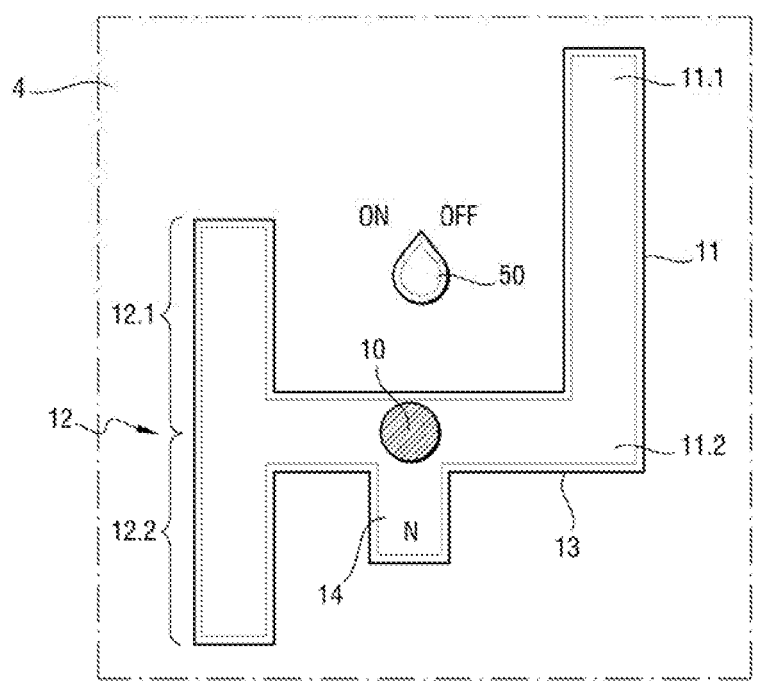
FIG. 4 is a schematic view of the control interface according to a first embodiment of the invention.

With particular reference to FIG. 4, the control interface 4 includes a motoractivation switch 50 that is movable between an "ON" and an "OFF" position, and a control element 10, such as a joystick, arranged to be movable by the pilot of aircraft A along a first scale 11 and a second scale 12 parallel to each other and connected to each other by a connecting section 13 including a neutral point 14.

The first scale 11 comprises two ends 11.1, 11.2 corresponding respectively to a maximum speed and a minimum speed, here zero, to control the electric motor 2 between these two speeds, depending on the position of the control element 10 along the first scale 11, by implementing the first control law.

The second scale 12 comprises a first section 12.1 having a first end corresponding to a maximum forward speed and a second end corresponding to a zero speed and which is connected to a first end of a second section 12.2 having a second end corresponding to a maximum reverse speed. The control element 10 can be moved along the second scale 12 to control the motor between one of the two maximum speeds and zero speed depending on the position of the control element 10:

by implementing the second control law when the control element 10 is in section 12.1;

by implementing the third control law when the control element 10 is in section 12.2.

For a given movement amplitude of the control element 10, the first control law determines a predetermined acceleration:

greater than the acceleration determined by the second control law for the same movement amplitude of the control element 10;

greater than the acceleration determined by the third control law for the same movement amplitude of the control element 10.

In addition, the maximum speed achievable with the first control law is higher than that achievable with the other two control laws.

For a given movement amplitude of the control element 10, the second control law determines a predetermined acceleration (e.g. an acceleration of 4 kn per second, it should be reminded that 1 kn, or knot, is 1852 m/hr) greater than the acceleration determined by the third control law (e.g. 0.5 kn per second) for the same movement amplitude of the control element 10. Alternatively, for a given movement amplitude of the control element 10, the second control law determines a predetermined acceleration equal to, or less than, the acceleration determined by the third control law for the same movement amplitude of the control element 10.

The acceleration predetermined by the first control law is compatible (i.e. more suitable) with a straight line movement or with curved long radius trajectories (resulting from a steering angle of the front landing gear between 0° and 30° for example) at a relatively high speed as during taxiing (at a speed between 10 and 20 kn for example).

The acceleration predetermined by the second control law is more suitable for making small radius turns (resulting from a steering angle of the front landing gear between 31° and 74° for example) at relatively low speeds (less than 10 kn for example) such as entering or leaving a parking space.

Figure 3:
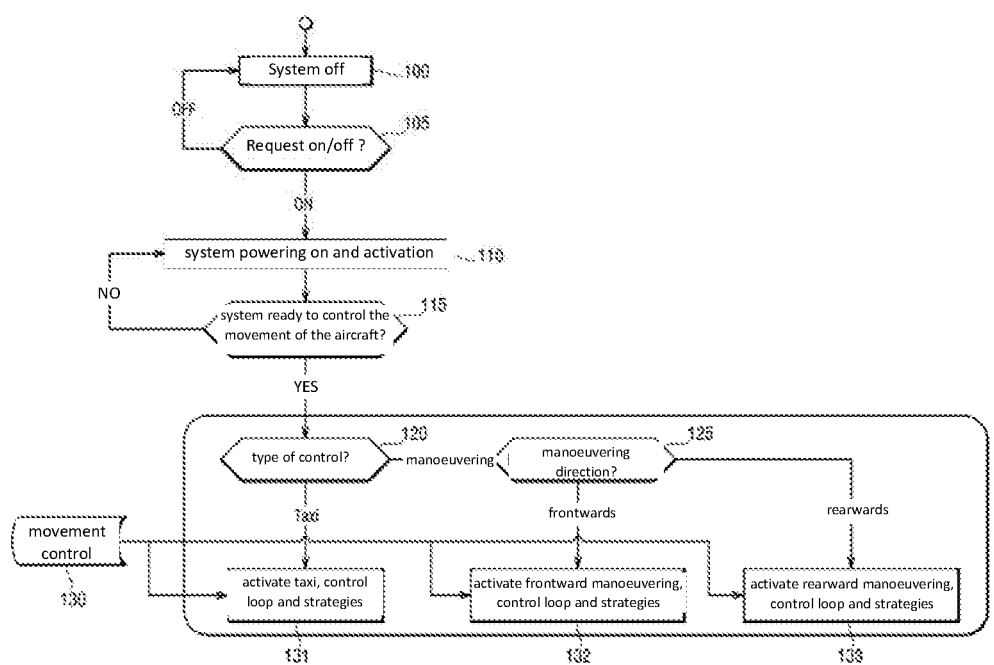
FIG. 3 is a block diagram of the aircraft control according to a second mode of implementation of the invention.

Also according to FIG. 3, with the motorizing device off, (100), the pilot who wishes to use the motorizing device activates the switch 50 (105) causing the power to be applied to the motorizing device 1 (110) and the control unit 3, which checks the condition of the motorizing device (115). The pilot then chooses the type of taxi he/she wishes to perform (120) and the direction of taxi (125) by moving the control element 10. The control unit 3 will then control the electric motor 2 (130) by applying the control law resulting from the pilot's choice (131) for the first control law, (132) for the second one, (133) for the third one.

Figure 5:
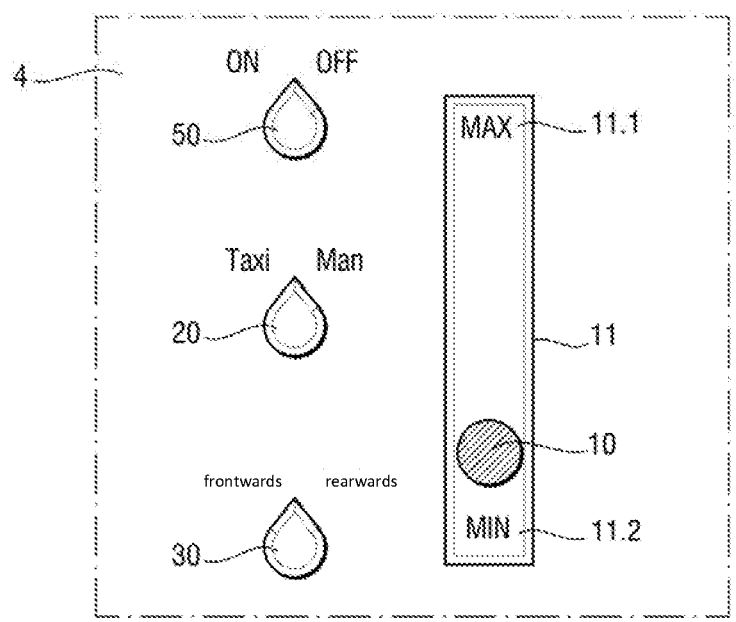
FIG. 5 is a schematic view of the control interface according to a second embodiment of the invention.

According to the second embodiment shown in FIG. 5, the electronic control unit 3 implements only a first control law for taxiing and a second control law for forward and reverse manoeuvres. The control interface 4 includes:

a control element 10 arranged to be movable by the pilot of the aircraft 3 along a scale 11 comprising two ends 11.1, 11.2 corresponding respectively to a maximum speed and a minimum speed to control the electric motor 2 between these two speeds according to the position of the control element 10 along the scale 11;

a selection device for the first control law or the second control law, in this case a switch 20;

a selection element for selecting a direction of rotation of the electric motor 2 when implementing the second control law, in this case a switch 30.

The switch 20 rotates here between a taxi position "Taxi" to command the control unit 3 to apply the first control law and a manoeuvring position "Man" to command the control unit 3 to apply the second control law.

The switch 30 rotates here between a "Forward" position to command the control unit 3 to drive the motor 2 forward and a "Reverse" position to command the control unit 3 to drive the motor 2 reverse. It should be noted that the control unit 3 is arranged to take into account the selection of the forward or reverse direction only when the switch 20 is in the manoeuvring position, in the taxi position only a forward movement is possible. It can be expected that placing the switch 20 in the taxi position will cause a LED on the switch 30 to light up to indicate that it is activated.

Figure 2:
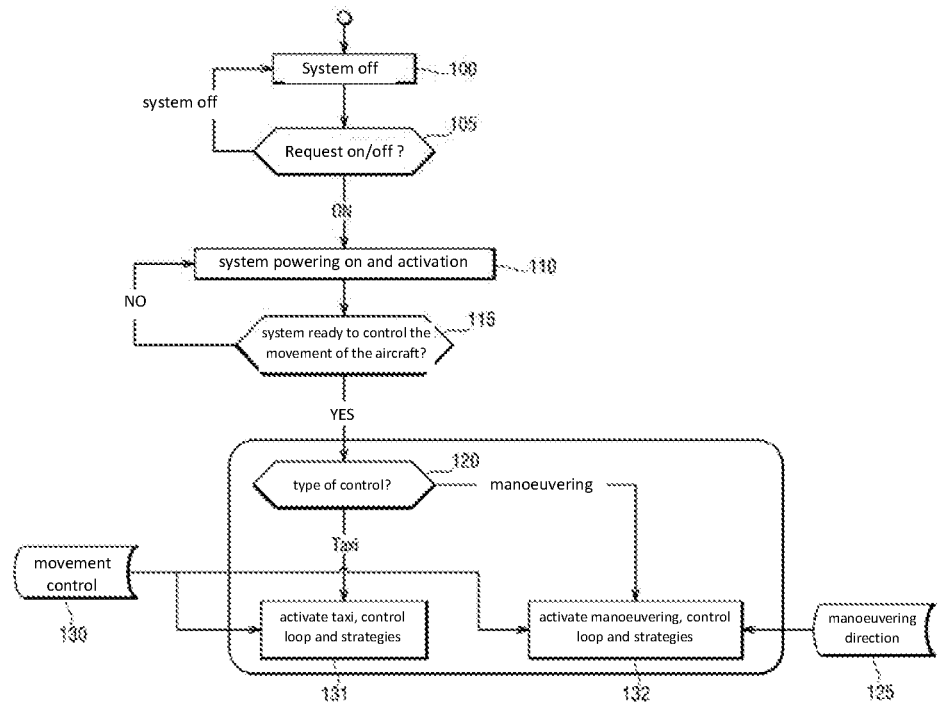
FIG. 2 is a block diagram of the aircraft control according to a first mode of implementation of the invention.

The corresponding operating mode is described in FIG. 2.

Of course, the invention is not limited to the described embodiment but encompasses any alternative solution within the scope of the invention as defined in the claims.

The device may have a structure different from the one described.

The device of the invention may be used for motorizing one or several wheel(s) of an aircraft. The device may include two electric motors each associated to one of the main landing gears and connected to the wheels of the main landing gear of the aircraft.

Switches 20, 30 can be replaced by any other device allowing selection and for example switch buttons such as push buttons.

The control element 10 can be replaced by any device allowing continuous variation, such as a potentiometer. The control element 10 could also be replaced by a switch allowing speed selection from predefined values. A speed selection switch for taxiing and a speed selection switch for manoeuvring could be provided, with the actuation of either switch automatically selecting the corresponding control law.

The control element 10 and switches 20, 30 can also be replaced by one or more touch screen(s).

The operating mode may be different from the one described. For example, the motorizing device can be designed so that it does not operate in reverse. The operating mode corresponds to that of FIG. 2 without operation 125.

A single speed can also be provided in reverse.

The steering angles or speeds mentioned may differ from those mentioned for information purposes in the description.

The invention claimed is:

1. A motorizing device for moving an aircraft equipped with a landing device having wheels on the ground, the motorizing device comprising at least one electric motor having an output shaft provided with means for rotational connection of the output shaft to at least one of the wheels of the landing device for driving said at least one of the wheels in rotation, and an electronic control unit connected on one hand to the at least one electric motor to control the at least one electric motor and on another hand to a control interface from which an aircraft pilot can transmit control signals which the electronic control unit is arranged to transform into motor control signals, wherein the electronic control unit is arranged to implement a first control law having determined dynamics to promote an aircraft movement speed and a second control law having dynamics to promote aircraft manoeuvrability, wherein the control interface comprises a control element arranged to be movable by the aircraft pilot of the aircraft along a first scale and a second scale parallel to each other and connected to each other by a connecting section including a neutral point, the first scale including two first ends corresponding respectively to a first maximum speed and a first minimum speed to control the at least one electric motor between said first maximum speed and said first minimum speed according to a position of the control element by implementing the first control law and the second scale comprising two second ends corresponding respectively to a second maximum speed and a second minimum speed to control the at least one electric motor between said second maximum speed and said second minimum speed according to the position of the control element by implementing the second control law, and wherein the second scale comprises a first section having a first third end corresponding to a maximum forward speed and a second third end corresponding to a zero speed and which is connected to a first fourth end of a second section having a second fourth end corresponding to a maximum reverse speed.

2. The motorizing device according to claim 1, wherein the electronic control unit is arranged to implement a third control law having determined dynamics to promote manoeuvrability of the aircraft, the second control law being arranged to control the at least one electric motor in a forward direction and the third control law being arranged to control the at least one electric motor in a reverse direction.

3. The motorizing device according to claim 1, wherein the control interface comprises a selection element for selecting a direction of rotation of the at least one electric motor during implementation of the second control law.

4. A motorizing device for moving an aircraft equipped with a landing device having wheels on the ground, the motorizing device comprising at least one electric motor having an output shaft provided with means for rotational connection of the output shaft to at least one of the wheels of the landing device for driving said at least one of the wheels in rotation, and an electronic control unit connected on one hand to the at least one electric motor to control the at least one electric motor and on another hand to a control interface from which an aircraft pilot can transmit by moving a control element to control signals which the electronic control unit is arranged to transform into motor control signals, wherein the electronic control unit is arranged to implement a first control law having determined dynamics to promote an aircraft movement speed and a second control law having dynamics to promote aircraft manoeuvrability so that for a given movement amplitude of the control element, the first control law determines an acceleration greater than an acceleration determined by the second control law for a same movement amplitude of the control element.

5. The motorizing device according to claim 4, wherein the electronic control unit is arranged to implement a third control law having determined dynamics to promote manoeuvrability of the aircraft, the second control law being arranged to control the at least one electric motor in a forward direction and the third control law being arranged to control the at least one electric motor in a reverse direction.

6. The motorizing device according to claim 4, wherein the control interface comprises the control element arranged to be movable by the aircraft pilot of the aircraft along a first scale and a second scale parallel to each other and connected to each other by a connecting section including a neutral point, the first scale including a first end and a second end corresponding respectively to a first maximum speed and a first minimum speed to control the motor between said first maximum speed and said first minimum speed according to a position of the control element by implementing the first control law and the second scale comprising two second ends corresponding respectively to a second maximum speed and a second minimum speed to control the at least one electric motor between said second maximum speed and said second minimum speed according to the position of the control element by implementing the second control law.

7. The motorizing device according to claim 6, wherein the control interface comprises a selection element for selecting a direction of rotation of the at least one electric motor during implementation of the second control law.

8. The motorizing device according to claim 4, wherein the control interface comprises the control element arranged to be movable by the aircraft pilot of the aircraft along a scale comprising two ends corresponding respectively to the maximum speed and a minimum speed to control the at least one electric motor between said maximum speed and said minimum speed according to a position of the control element, and a selection element of the first control law or the second control law.

9. The motorizing device according to claim 8, wherein the control interface comprises a second selection element for selecting a direction of rotation of the at least one electric motor during implementation of the second control law.

* * * * *